(12) United States Patent
Guth et al.

(10) Patent No.: US 10,982,748 B2
(45) Date of Patent: Apr. 20, 2021

(54) ADAPTER PLATE

(71) Applicant: WITTENSTEIN SE, Igersheim (DE)

(72) Inventors: Philipp Guth, Stuttgart (DE);
Sebastian Hüsken, Limbach (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 16/789,548

(22) Filed: Feb. 13, 2020

(65) Prior Publication Data
US 2020/0263778 A1    Aug. 20, 2020

(30) Foreign Application Priority Data

Feb. 14, 2019 (DE) .......................... 102019103781.6

(51) Int. Cl.
*F16H 57/02*  (2012.01)
*F16H 57/032* (2012.01)

(52) U.S. Cl.
CPC ........... *F16H 57/02* (2013.01); *F16H 57/032* (2013.01); *F16H 2057/02017* (2013.01); *F16H 2057/02026* (2013.01); *F16H 2057/02034* (2013.01)

(58) Field of Classification Search
CPC ................... F16H 57/02; F16H 57/032; F16H 2057/02017; F16H 2057/02026
See application file for complete search history.

(56) References Cited

U.S. PATENT DOCUMENTS

2020/0263778 A1*  8/2020  Guth ...................... F16H 57/02

FOREIGN PATENT DOCUMENTS

| DE | 4425736 A1 | 1/1996 | |
|---|---|---|---|
| DE | 19949994 A1 | 4/2001 | |
| DE | 10059503 A1 | 6/2002 | |
| DE | 102008045476 A1 | 4/2009 | |
| DE | 102012202789 A1 | 8/2013 | |
| DE | 102015105609 A1 * | 10/2016 | ............ G01M 3/025 |
| DE | 102017106311 A1 * | 9/2018 | ........... F16H 57/025 |

OTHER PUBLICATIONS

Translation DE-102015105609-.*
De Donno, Danilo, et al. "A long-range computational RFID tag for temperature and acceleration sensing applications." Progress in Electromagnetics Research 45 (2013): 223-235.

* cited by examiner

*Primary Examiner* — Vicky A Johnson
(74) *Attorney, Agent, or Firm* — Bachman & LaPointe, PC

(57) ABSTRACT

Adapter plate (1) for connecting a gearbox to a motor, having a plate (3) having a continuous through opening (11) for introducing an output shaft of a motor capable of being assembled on the plate (3); a clearance (9) which in terms of the axis of the through opening (11) in the plate (3) opens in a radially outward manner and is configured as a pocket hole opening, and a sensor mechanism installation which is completely received in the clearance (9) and comprises a sensor, a memory, and an evaluation unit, wherein the sensor and the memory are connected to the evaluation unit.

16 Claims, 7 Drawing Sheets

1

ADAPTER PLATE

BACKGROUND OF THE INVENTION

The disclosure relates to an adapter plate for connecting a gearbox to a motor, and to a method for producing an adapter plate.

Adapter plates for connecting a motor to a gearbox are known from the prior art, for example from DE 10 2017 106 311 A1, wherein a sensor is provided on the adapter plate.

However, the adapter plates known from the prior art are constructed so as to be comparatively large, or in geometrical or mechanical terms so as to require further adaptation to other systems.

SUMMARY OF THE INVENTION

It is an object of the disclosure to specify an adapter plate which is improved in comparison to the prior art. In particular, the adapter plate is to be compact, to protect a sensor of the adapter plate against damage, or advantageously enable data measured by a sensor to be evaluated or memorized.

The object is achieved by an adapter plate for connecting a gearbox to a motor as disclosed herein, and by a method for producing an adapter plate, also as disclosed herein.

According to one aspect, an adapter plate for connecting a gearbox to a motor is specified, having a plate having a continuous through opening for introducing an output shaft of a motor capable of being assembled on the plate; a clearance which in terms of the axis of the through opening opens in a radially outward manner in the plate and is configured as a pocket hole opening, and a sensor mechanism installation which is completely received in the clearance and comprises a sensor, a memory, and an evaluation unit, wherein the sensor and the memory are connected to the evaluation unit. Pocket hole opening typically means that this is not a continuous opening, or is one analogous to a blind bore, for example.

According to one further aspect, a method for producing an adapter plate according to one of the embodiments described herein for monitoring a gearbox is specified, comprising overmolding or casting the sensor mechanism installation, and inserting the overmolded or cast sensor mechanism installation into a clearance of a plate.

A typical aspect of the invention relates to a combination of an adapter plate in one of the typical embodiments described herein and a gearbox, wherein the adapter plate is in particularly screw-fitted directly to the gearbox, for example by way of at least 4 tensioning means, such as screws or threaded bolts, which engage through bores of the adapter plate and are received in a threaded opening of a gearbox housing, or engage through a flange of the gearbox.

In typical embodiments, the adapter plate is provided for connecting a planetary gear to a motor. In typical embodiments, the adapter plate is provided for assembling a worm gear or a Galaxie® gear (obtainable from WITTENSTEIN SE, Germany) on a motor. The adapter plate is in particular provided for connecting a gearbox to an electric motor. The adapter plate is typically connected, in particular screw-fitted, directly to a gearbox housing of the gearbox, in particular without further adapter elements between the gearbox housing and the adapter plate.

In typical embodiments, the plate has an access opening which is perpendicular in terms of the direction of the through opening. The access opening can be aligned so as to be perpendicular and radially offset in relation to the axis of the through opening, for example. The access opening typically enables access to a tool for clamping a clamping ring which is disposed in the region of the plate.

In typical embodiments, the coupling between a motor and a gearbox which are connected to one another by the adapter plate takes place within the through opening of the adapter plate. The gearbox typically comprises a receptacle sleeve which protrudes into the through opening of the adapter plate and is provided for receiving a motor shaft of a motor. The receptacle sleeve at the side toward the gearbox is configured for receiving a drive sprocket. A clamping ring having a clamping crew is typically attached to the receptacle sleeve, wherein the clamping ring is embodied such that the clamping ring couples the receptacle sleeve to a motor shaft by tightening the clamping screw, or decouples the receptacle sleeve from a motor shaft by loosening a tightened clamping screw.

The clamping screw of the clamping ring and the access opening of the adapter plate are typically positioned such that the clamping screw can be tightened or loosened by way of the access opening. The access opening typically has a thread, on account of which the access opening can be closed by driving a screw thereinto, or can be opened by driving out therefrom a screw that has previously been driven-in. Further embodiments may have no threads. Should the access opening not be required for tightening or loosening the clamping screw, the access opening is typically closed from the outside by means of a screw or a plug.

In typical embodiments, the sensor mechanism installation is completely received in the clearance of the plate. The sensor mechanism installation typically does not protrude externally beyond the contour of the plate, or in the region of the clearance terminates so as to be substantially flush with the surface of the plate.

In typical embodiments, the sensor, the memory, or the evaluation unit are disposed on a circuit board. The sensor mechanism installation may comprise further building blocks such as, for example, a buffer capacitor, or a connector for a cable.

In typical embodiments, bores in the plate for receiving screws for fastening a motor housing of a motor, or a gearbox housing of a gearbox, are provided in corner regions of the plate. The bores are typically embodied as axial bores in the axial direction, or in the direction of the through opening.

In typical embodiments, the clearance is disposed between two of the axial bores. The clearance is typically disposed in a radially thin region of the plate.

In typical embodiments, the sensor mechanism installation is cast or overmolded. The sensor mechanism installation is typically cast in plastics material, in particular artificial resin, for example epoxy resin, or is overmolded with plastics material, in particular with "Thermelt 869 Black" by the company Bostik S.A. The sensor mechanism installation, optionally with the exception of a potentially present connector, is typically completely sheathed with plastics material. The sensor mechanism installation is typically sheathed with plastics material such that there is no direct contact between the sensor of the sensor mechanism installation and the plate, or between the sensor mechanism installation and the plate.

In typical embodiments, the clearance is filled so as to be at least substantially flush with an external contour of the plate. The sheathed sensor mechanism installation typically does not have any interfering contours in relation to the external contour of the plate. The sensor mechanism installation is typically press-fitted or adhesively bonded in the clearance of the plate, or is secured in the clearance by means of the form-fit. In typical embodiments, the surface of the sensor mechanism installation does not lie outside the contour of the plate; for example, the sensor mechanism installation can terminate so as to be flush, or in relation to the contour can lie slightly deeper or recessed in the clearance, for example by at most 1 mm or at most 2 mm.

The clearance in the axial direction of the through opening is typically delimited by walls, wherein at least one of said axial walls has a thickness of at least 1 mm or at most 8 mm. The axial walls are typically formed by the plate. The clearance can be machined into the plate, for example, or may have been eroded therein. In further embodiments, at least one of the axial walls has a thickness of at least 2 mm or at most 6 mm. At least one of the axial walls typically has a thickness of at least 5% or at most 15% of the axial thickness of the plate. The clearance in the radial direction has a depth of at most 97% or of at least 80%, typically at least 90%, of the minimum radial thickness of the plate. In typical embodiments, the plate has a height of between 50 mm and 100 mm, at an axial thickness of approximately 20 mm to 35 mm. The plate has an axial thickness of at least 25%, typically at least 30%, or at most 45%, typically at most 40%, of the height of the plate.

In typical embodiments, the sensor mechanism installation comprises a temperature sensor that is connected to the evaluation unit, or an acceleration sensor that is connected to the evaluation unit. The temperature sensor is typically an analog temperature sensor, for example of the type KTY82, which is cost-effective and has a high accuracy and stability. In further embodiments, the temperature sensor is a digital temperature sensor, for example of the type TMP100. The acceleration sensor is typically a triaxial acceleration sensor, in particular a triaxial MEMS (micro-electro-mechanical system) acceleration sensor, for example of the type ADXL345.

The memory is typically specified for memorizing measurement data measured by the sensor, data issued by the evaluation unit, and/or product-specific data. The memory is typically embodied as a flash memory. Product-specific data comprise in particular a production date of the adapter plate, a serial number of the adapter plate, threshold values for measurement data for determining an operating state or a nominal installation position of the adapter plate.

In typical embodiments, the evaluation unit is embodied as a microcontroller. This may contribute to a compact construction mode.

In typical embodiments, the sensor mechanism installation comprises an interface for transmitting energy or data. The interface is typically an IO-link interface for transmitting energy and data. In typical embodiments, the sensor mechanism installation comprises an EtherCAT interface or a RS232 interface. In typical embodiments, the sensor mechanism installation comprises an interface for the wireless transmission of energy or data, in particular an interface for transmitting data by radio, for example by means of Bluetooth or WLAN.

The sensor mechanism installation typically comprises a connector that is connected to an interface, in particular for a cable for transmitting energy or data. The connector is typically disposed in the clearance such that a cable can be connected to the connector radially from the outside, without moving the sensor mechanism installation in the clearance. If the sensor mechanism installation is cast in plastics material or is overmolded with plastics material, there is typically a hole in the plastics material toward the connector such that a cable can be connected to the connector radially from the outside.

In typical embodiments, the sensor mechanism installation comprises an electric energy accumulator. The electric energy accumulator is typically embodied as a battery, in particular a single-use battery or a rechargeable battery. The battery is typically required only as backup in the event of a power outing in the energy supply by way of the cable, and therefore can be embodied as a single-use battery. The electric energy accumulator in the event of interruptions in the energy supply is typically specified for maintaining the operation of the sensor mechanism installation, in particular the performing of measurements by means of the sensor, the evaluation of the measurements by means of the evaluation unit, the memorizing of data, or communicating data by way of an interface for data transmission.

In typical embodiments, the electric energy accumulator is specified for guaranteeing the operation of the sensor mechanism installation over comparatively long temporal periods without a supply of energy by way of an interface for transmitting energy, wherein the temporal periods are typically longer than 3 months, in particular are longer than 6 months, at room temperature. Typical embodiments of the sensor mechanism installation can be operated in at least two energy modes, a normal mode and an energy-saving mode in which the sensor mechanism unit is only occasionally woken up for acquiring measurement data.

In typical embodiments, the plate is at least substantially produced from aluminum, or composed of aluminum. The high thermal conductivity of aluminum herein ensures the transmission of thermal energy from the gearbox to the adapter plate. In further embodiments, the plate is at least substantially produced from steel.

The plate is typically integrally produced. On account of the integral embodiment of the plate, the plate can have a high stability.

In typical methods for producing an adapter plate, the sensor mechanism installation outside the clearance of the plate is cast in plastics material, or is overmolded with plastics material. In one typical embodiment of the method, the sensor mechanism installation is cast in artificial resin, for example in epoxy resin. In one further typical embodiment of the method, the sensor mechanism installation is overmolded with plastics material, in particular with "Thermelt 869 Black" by the company Bostik S.A. The sensor mechanism installation is typically overmolded with plastics material at a low injection pressure and at moderate process temperatures, in particular in a hot-melt method. Typical process temperatures lie between 150° C. and 250° C., in particular between 200° C. to 220° C.

A connector of the sensor mechanism installation is typically kept free of plastics material. The plastics material sheath which surrounds the sensor mechanism installation conjointly with the sensor mechanism installation is then typically press-fitted in the clearance. In typical embodiments, the shape of the plastics-material sheathing can be adapted to the shape of the clearance after the sensor mechanism installation has been cast or overmolded.

In typical methods, the plastics-material sheath conjointly with the sensor mechanism installation is adhesively bonded in the clearance, or is secured in the clearance by means of a form-fit. In typical embodiments of the method, the sensor mechanism installation is cast directly into the clearance of the plate in plastics material. The plastics-material sheath, which in particular prevents any direct electrical contact between the sensor mechanism installation and the plate of the adapter plate, enables a simple attachment of the gearbox to the motor and the application, wherein measures for electrostatic discharging are dispensed with in some typical embodiments.

Typical embodiments of the invention comprise a motor/gearbox combination having a motor and a gearbox, wherein only or exactly one adapter plate according to one of the embodiments described herein is disposed between a gearbox housing of the gearbox and a motor housing of the motor. Typical embodiments of the invention comprise a gearbox having an adapter plate according to one of the embodiments described herein, wherein the adapter plate is in particular connected directly to the gearbox housing. In particular, the gearbox housing adjoins directly the adapter plate according to the invention such that the receptacle sleeve embodied as a pinion shaft of the gearbox is received in the adapter plate.

In typical embodiments of the adapter plate, the sensor mechanism installation from a temperature measured by a temperature sensor determines an operating state of a gearbox that is connected to the adapter plate. The sensor mechanism installation from the accelerations measured by an acceleration sensor typically determines the installed position of the gearbox that is connected to the adapter plate, or vibrations in the adapter plate. The evaluation unit from the operating state typically determines an overall operating period of the gearbox, or residual service life of the gearbox.

Measurement data measured by the sensor, data issued by the evaluation unit, or product-specific data from the sensor mechanism installation are typically memorized in the memory, or by way of an interface transmitted to an external device, for example to a central monitoring device, or to a portable output apparatus. The sensor mechanism installation typically communicates continuously with the external device. In one further typical embodiment of the invention, the sensor mechanism installation, in particular the memory of the sensor mechanism installation, is read at regular temporal intervals.

Typical embodiments of the adapter plate in comparison with the prior art offer a compact, cost-effective, and highly integrated solution for providing gearbox-specific measurement data and complex evaluated data. The adapter plate is independent of the motor controller and offers simple linking to systems for monitoring machines by means of a commonplace interface for communicating with external devices. Typical embodiments of the adapter plate moreover have identical bores and a shape which is identical or similar to that of existing adapter elements without a sensor mechanism installation, on account of which the adapter plate is compatible with existing gearboxes. The sensor mechanism unit on account of being overmolded or cast, respectively, is protected against environmental influences.

BRIEF DESCRIPTION OF THE DRAWINGS

Further advantages and features of preferred embodiments of the invention will be explained hereunder by means of the appended drawings in which.

DETAILED DESCRIPTION

Typical embodiments will be described hereunder by means of the figures, wherein the invention is not limited to the exemplary embodiments, the scope of the invention rather being defined by the claims.

In the description of the figures, the same reference signs are used for identical or similar parts. Features which have already been described in the context of other figures, are in some instances not described once again for the sake of clarity.

Figure 1:
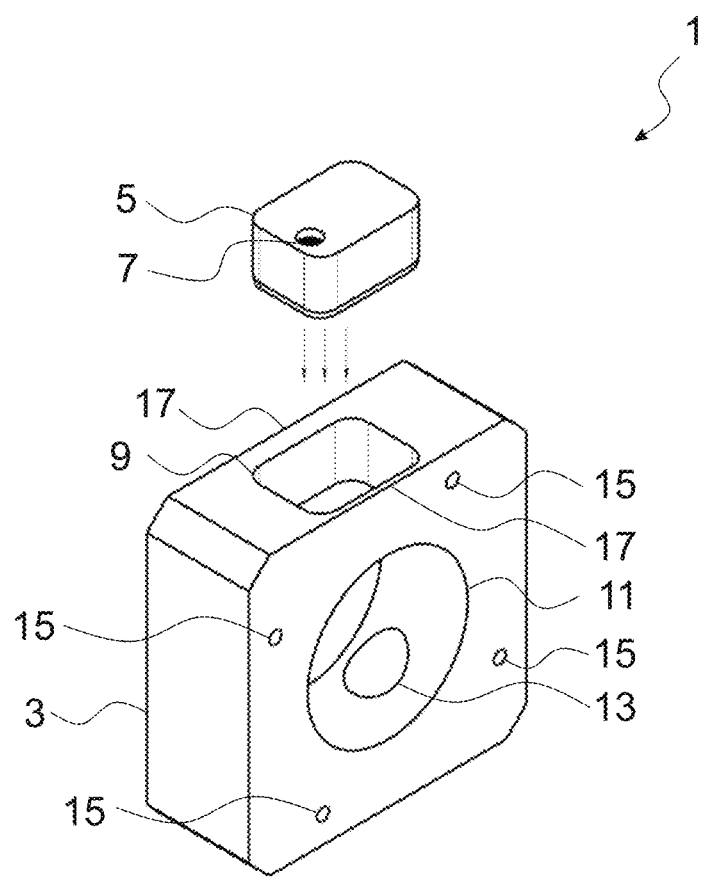
FIG. 1 shows a schematic isometric exploded illustration of a typical adapter plate.

FIG. 1 shows a schematic isometric exploded illustration of a typical adapter plate 1. The plate 3 has a continuous through opening 11. A non-continuous clearance 9, or a clearance 9 embodied as a pocket hole opening, which is provided for receiving a sensor mechanism block 5 is present in the plate 3.

In typical embodiments, the clearance has a quadrangular cross section having radiused corners. The edges of the quadrangular cross section are typically aligned so as to be parallel with lateral edges of the plate. In typical embodiments, the clearance is embodied having a circular cross section, or having an oval or an elliptic cross section.

The sensor mechanism block 5 comprises a sensor mechanism installation and a plastics material sleeve that sheathes the sensor mechanism installation, wherein the plastics material sleeve is typically produced by casting the sensor mechanism installation in plastics material or by injection-molding the sensor mechanism installation in plastics material.

The exemplary embodiment of the sensor mechanism installation in the sensor mechanism block 5 of FIG. 1 comprises a connector 7 which is accessible from the outside by way of a hole in the plastics-material sheath of the sensor mechanism block 5. The connector 7 can in particular be utilized for connecting a cable to the connector 7. The clearance 9 is typically closed toward the through opening 11.

The clearance 9 in the axial direction is typically delimited by walls 17 which are composed of the material of the plate 3, wherein "axial" corresponds to the direction of the through opening.

An access opening 13 in terms of the axis of the through opening 11 runs from the through opening 11 continuously toward the outside. The access opening 13 herein is aligned so as to be radially offset, and in the radial direction so as to be perpendicular, to the direction of the through opening 11.

The plate 3 furthermore contains bores 15 which are embodied in the axial direction. The bores 15 are typically configured for connecting the adapter plate 1 to a gearbox housing of a gearbox or a motor housing of a motor.

Figure 2:
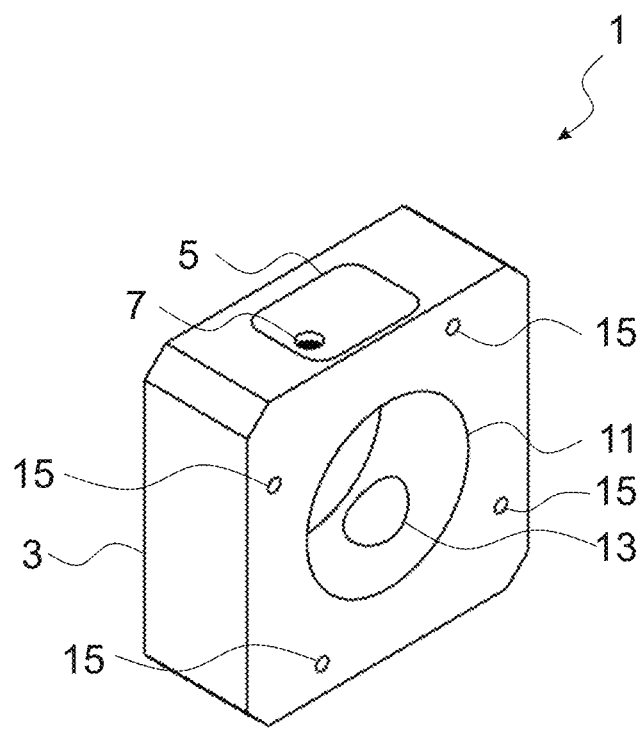
FIG. 2 shows a schematic isometric view of the adapter plate of FIG. 1.

FIG. 2 shows a schematic isometric view of the typical adapter plate 1 of FIG. 1, having a sensor mechanism block 5 which is completely received in the clearance 9. The clearance 9 by way of the sensor mechanism block 5 is filled so as to be flush with the external contour of the plate 3. This may help in avoiding accumulations of dirt and facilitates the insulation of the adapter plate 1 in the case of existing applications, since no additional geometric boundary parameters are to be taken into account.

Figure 3:
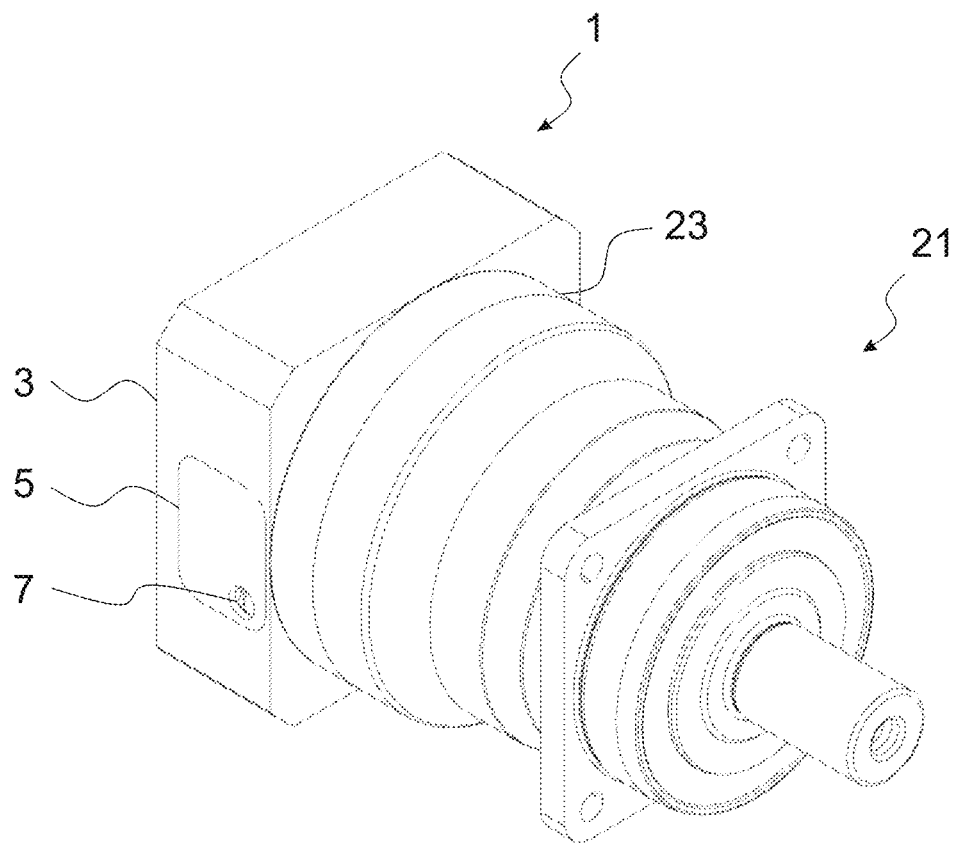
FIG. 3 shows a schematic isometric view of the adapter plate of FIG. 1 having a gearbox.

FIG. 3 shows a schematic isometric view of the typical adapter plate 1 of FIG. 1 and FIG. 2, wherein the adapter plate 1 in FIG. 3 is connected to a gearbox 21. The adapter plate 1 is fastened to a gearbox housing 23 of the gearbox 21. No further adapter elements or similar are provided between the gearbox housing 23 and the adapter plate 1. The adapter played in typical embodiments directly abuts a gearbox housing of a gearbox.

Figure 4:
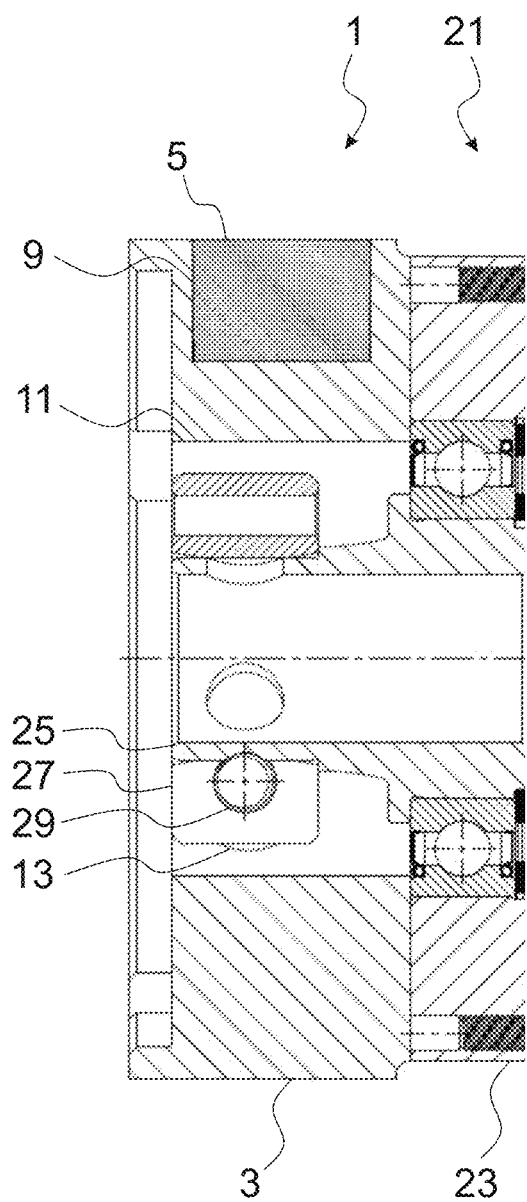
FIG. 4 shows a fragment of a schematic sectional view of the adapter plate having the gearbox of FIG. 3.

FIG. 4 shows a schematic sectional view of the assembly of FIG. 3, in which the adapter plate 1 is connected to the gearbox 21. The adapter plate 1 is typically connected, in particular screw-fitted, to the gearbox housing 23 of the gearbox 21 by way of bores in the plate 3. A receptacle sleeve 25 of the gearbox 21 typically protrudes into the through opening 11 of the adapter plate 1. The receptacle sleeve 25 is mounted in the gearbox housing 23 by way of a roller bearing which is supported axially on the adapter plate 1.

In the embodiment of FIG. 4, a clamping ring 27 is attached to the receptacle sleeve 25 by way of a clamping screw 29. A motor shaft of a motor that is introduced into the receptacle sleeve 25 can typically be coupled to the receptacle sleeve 25 by tightening the clamping screw 29. The receptacle sleeve 25 and the motor shaft coupled to one another can typically be decoupled from one another by loosening the clamping screw 29. The clamping screw 29 and an access opening 13 for assembling are positioned axially such that the clamping screw 29 can be tightened or loosened from the outside through the access opening 13.

Figure 5:
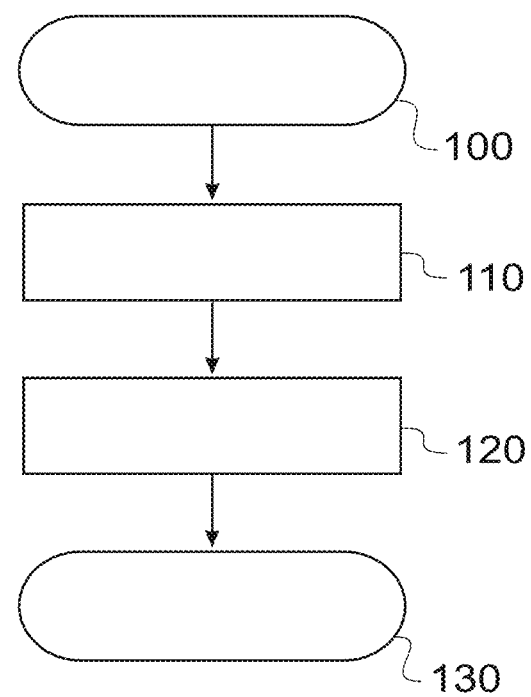
FIGS. 5 and 5A schematically show a method for producing a typical adapter plate and components thereof.

FIG. 5 schematically shows the sequence of a typical method for producing an adapter plate in one of the typical embodiments described herein. The method will be described by means of the exemplary embodiments described in FIGS. 1 to 4.

Figure 5A:
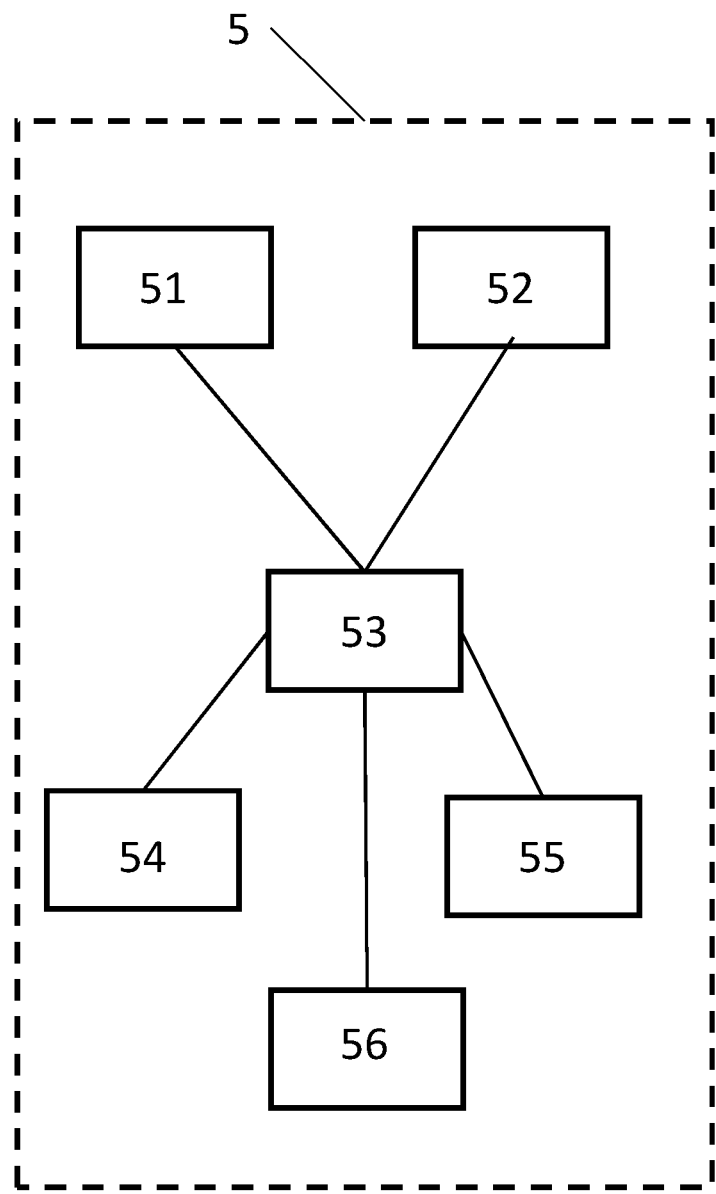

In a first step 100, the sensor mechanism installation is produced in that a sensor 51 (see FIG. 5A schematically illustrating components) and a memory 52 are connected to an evaluation unit 53, wherein the sensor 51, the memory 52, and the evaluation unit 53 are disposed on a circuit board. Further building blocks are in particular integrated in the sensor mechanism installation at 100, for example a connector 54, an interface for transmitting energy or data 55, or an electric energy accumulator 56. Should the sensor mechanism unit comprise a connector, the connector is typically masked.

In a step 110, the sensor mechanism installation is overmolded with plastics material, in particular at a low injection pressure and a moderate temperature, or is cast in plastics material, in particular in epoxy resin. Should the sensor mechanism unit comprise a connector, the connector is typically exposed after the sensor mechanism unit has been cast or overmolded.

After 110 and prior to 120, the shape of the sensor mechanism installation sheathed with plastics material can be adapted to the shape of the clearance in the plate of the adapter plate. The sensor mechanism block which comprises the sensor mechanism installation and the plastics material that sheathes the sensor mechanism installation can in particular be adapted to the clearance such that the sensor mechanism block fits into the clearance so as to be flush with the external contour of the adapter plate.

At 120, the sensor mechanism block is inserted into the clearance of the plate. In typical embodiments of the method, the sensor mechanism block is press-fitted or adhesively bonded in the clearance, or is secured in the clearance by means of a form-fit.

The method concludes at step 130.

Figure 6:
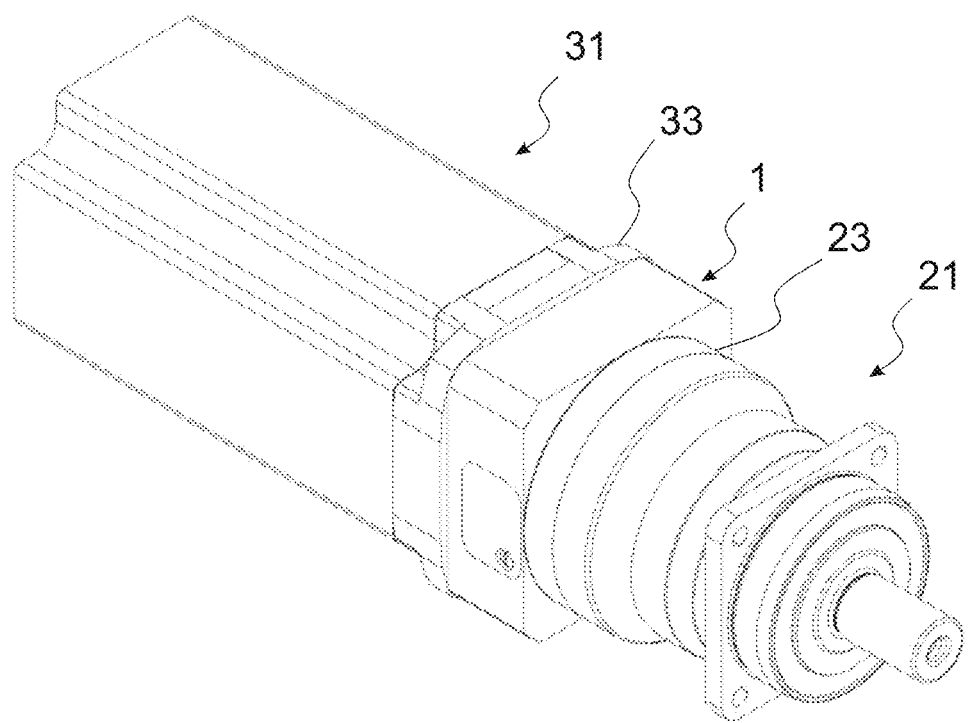
FIG. 6 shows a schematic isometric view of the adapter plate of FIG. 1, having a gearbox and a motor.

FIG. 6 shows a schematic isometric view of the typical adapter plate 1 of FIG. 1 and of FIG. 2, wherein the adapter plate 1 in FIG. 6 is connected to a gearbox 21 and a motor 31.

The adapter plate 1 is fastened to a gearbox housing 23 of the gearbox 21 and to a motor housing 33 of the motor 31. No further adapter elements or similar are provided between the gearbox housing 23 and the adapter plate 1, and between the motor housing 33 of the motor 31 and the adapter plate 1.

In typical embodiments, the adapter plate directly abuts a gearbox housing of a gearbox and a motor housing of a motor.

The invention claimed is:

1. Adapter plate for connecting a gearbox to a motor, comprising:
   a plate having a continuous through opening for introducing an output shaft of a motor capable of being assembled on the plate;
   a clearance which in terms of the axis of the through opening opens in a radially outward manner in the plate and is configured as a pocket hole opening; and
   a sensor mechanism installation which is completely received in the clearance and comprises a sensor, a memory, and an evaluation unit, wherein the sensor and the memory are connected to the evaluation unit, and
   wherein the sensor mechanism installation comprises at least one of a temperature sensor that is connected to the evaluation unit, and an acceleration sensor that is connected to the evaluation unit.

2. Adapter plate according to claim 1, wherein axial bores in the plate for receiving screws for fastening a motor housing of a motor, or a gearbox housing of a gearbox, are provided in corner regions of the plate.

3. Adapter plate according to claim 2, wherein the clearance is disposed between two of the axial bores.

4. Adapter plate according to claim 1, wherein the sensor mechanism installation is at least one of cast and overmolded.

5. Adapter plate according to claim 4, wherein the clearance is filled so as to be flush with an external contour of the plate.

6. Adapter plate according to claim 1, wherein the clearance in the axial direction is delimited by walls, wherein at least one of the axial walls has a thickness of at least 1 mm and/or at most 8 mm.

7. Adapter plate according to claim 1, wherein the memory is specified for memorizing at least one of measurement data measured by the sensor, data issued by the evaluation unit, and product-specific data.

8. Adapter plate according to claim 1, wherein the evaluation unit is a microcontroller.

9. Adapter plate according to claim 1, wherein the sensor mechanism installation comprises an interface for transmitting at least one of energy and data.

10. Adapter plate according to claim 1, wherein the sensor mechanism installation comprises an electric energy accumulator.

11. Adapter plate according to claim 1, wherein the plate is at least substantially produced from aluminum, or composed of aluminum, or is integrally produced.

12. A method for producing an adapter plate according to claim 1 for monitoring a gearbox, comprising
   overmolding or casting the sensor mechanism installation; and
   inserting the overmolded or cast sensor mechanism installation into the clearance of the plate.

13. Motor/gearbox combination having a motor and a gearbox, wherein only an adapter plate according to claim 1 is disposed between a gearbox housing of the gearbox and a motor housing of the motor.

14. Gearbox having an adapter plate according to claim 1.

15. Adapter plate for connecting a gearbox to a motor, comprising:
- a plate having a continuous through opening for introducing an output shaft of a motor capable of being assembled on the plate;
- a clearance which in terms of the axis of the through opening opens in a radially outward manner in the plate and is configured as a pocket hole opening; and
- a sensor mechanism installation which is completely received in the clearance and comprises a sensor, a memory, and an evaluation unit, wherein the sensor and the memory are connected to the evaluation unit,
- wherein the sensor mechanism installation comprises at least one of a temperature sensor that is connected to the evaluation unit, and an acceleration sensor that is connected to the evaluation unit, and
- wherein the clearance in the axial direction is delimited by walls, wherein at least one of the axial walls has a thickness of at least 1 mm and/or at most 8 mm.

16. Adapter plate for connecting a gearbox to a motor, comprising:
- a plate having a continuous through opening for introducing an output shaft of a motor capable of being assembled on the plate;
- a clearance which in terms of the axis of the through opening opens in a radially outward manner in the plate and is configured as a pocket hole opening; and
- a sensor mechanism installation which is completely received in the clearance and comprises a sensor, a memory, and an evaluation unit, wherein the sensor and the memory are connected to the evaluation unit,
- wherein the sensor mechanism installation comprises at least one of a temperature sensor that is connected to the evaluation unit, and an acceleration sensor that is connected to the evaluation unit, and
- wherein the sensor mechanism installation comprises an electric energy accumulator.

* * * * *